United States Patent [19]

Saito et al.

[11] Patent Number: 5,434,694
[45] Date of Patent: Jul. 18, 1995

[54] SIGNAL ISOLATING DEVICE

[75] Inventors: Hitoshi Saito; Takao Kajitani; Kenji Yamaguchi; Akio Yoshino, all of Tokyo, Japan

[73] Assignee: Yokogawa Electric Corporation, Tokyo, Japan

[21] Appl. No.: 8,372

[22] Filed: Jan. 25, 1993

[30] Foreign Application Priority Data

Mar. 31, 1992 [JP] Japan .................. 4-077393
Apr. 3, 1992 [JP] Japan .................. 4-081966
Apr. 8, 1992 [JP] Japan .................. 4-087014

[51] Int. Cl.6 .................................. H04B 10/04
[52] U.S. Cl. ............................. 359/186; 359/161; 250/551; 375/238
[58] Field of Search ........... 375/22, 27; 250/551; 359/184, 185, 186, 161

[56] References Cited

U.S. PATENT DOCUMENTS

| | | | |
|---|---|---|---|
| 3,794,841 | 2/1974 | Consentino | 359/161 |
| 4,140,980 | 2/1979 | Cummings | 307/263 |
| 4,546,262 | 10/1985 | Huggins | 250/551 |
| 4,678,937 | 7/1987 | Price | 359/161 |
| 4,812,815 | 3/1989 | Miyakoshi | 359/175 |
| 5,043,587 | 8/1991 | Miki | 250/551 |

*Primary Examiner*—Leslie Pascal
*Attorney, Agent, or Firm*—Moonray Kojima

[57] ABSTRACT

A signal isolating device, such as used in a signal conditioner which converts an output signal from a temperature sensor, or the like, in a process control system, comprising a pulse width signal outputting means, which receives a pulse width modulated signal and produces differentiated pulses at a leading edge and at a trailing edge of the pulse width modulated signal; a first photo-coupler activated by the differentiated pulse produced at the leadinge edge; a second photocoupler activated by the differentiated pulse produced at the trailing edge; a differential pulse reception means comprising a reception resistor for receiving output pulses from the first photocoupler and the second photocoupler and which produces a set pulse or a reset pulse according to the signal generated at the reception resistor; and a flip-flop circuit which is set or reset by the pulse signal produced by the differential pulse reception means. Advantageously, use of electric power is reduced and signal isolation is attained with stability and without being affected by extraneous noise.

8 Claims, 18 Drawing Sheets (PC1 LED Current)

(PC2 LED Current)
Fig.3 (f) VF 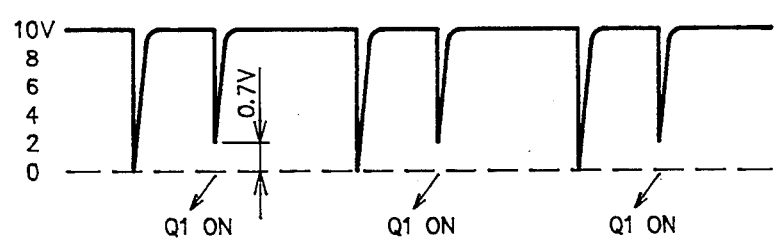
Fig.3 (g) VG 

Fig.3 (j) $\overline{\text{OUT}}$ 
Fig.3 (k) OUT 

(PC1 LED Current)

(PC2 LED Current)

Fig.8 (j) OUT 
Fig.8 (k) $\overline{\text{OUT}}$ 

(PC1 LED Current)

(PC2 LED Current)

Fig.13 (i) OUT 

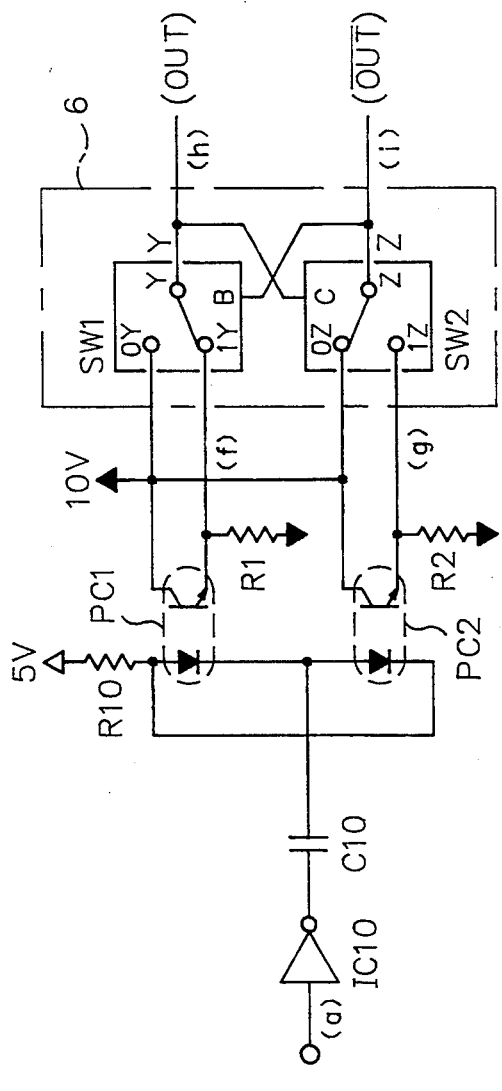
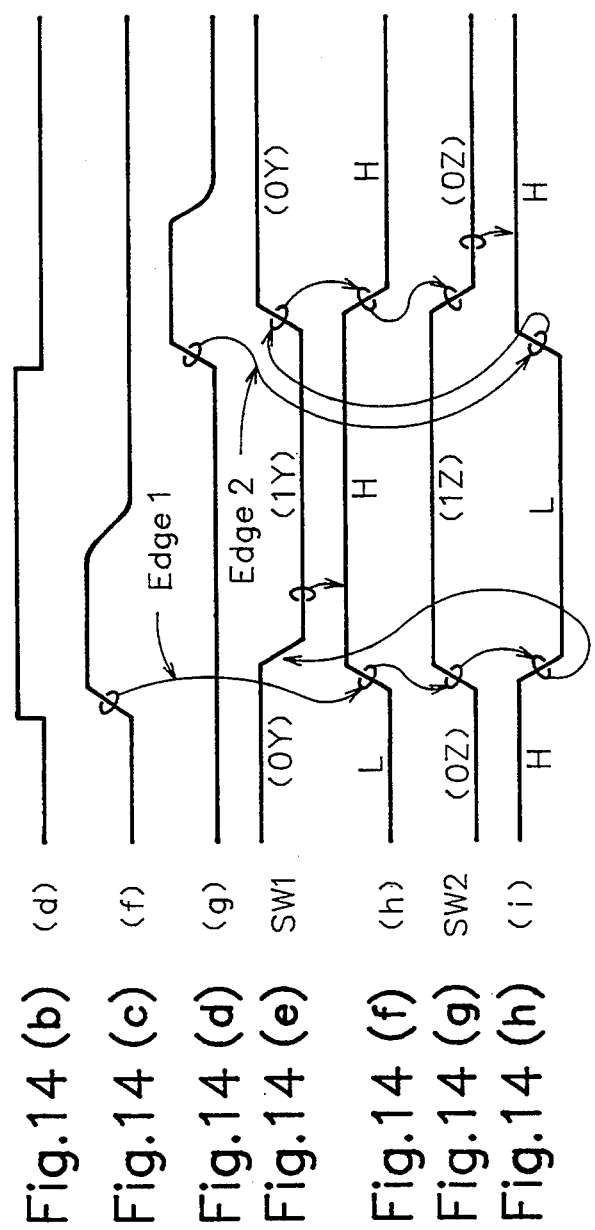
Fig.14 (a)
Fig.14 (b)
Fig.14 (c)
Fig.14 (d)
Fig.14 (e)
Fig.14 (f)
Fig.14 (g)
Fig.14 (h)

5,434,694

SIGNAL ISOLATING DEVICE

BACKGROUND OF THE INVENTION

1. Field of Invention

This invention relates to a signal isolating device, utilized, for example, in a signal converter which converts an output signal from a sensor, such as a temperature sensor installed in process control equipment, into a normalized signal; and more particularly, to such a device which utilizes pulse width modulated signals and photocouplers to provide signal isolation.

2. Description of the Prior Art

Signal converters which convert signals obtained from various sensors into normalized signals and isolate signals, are disclosed, for example, in U.S. Pat. No. 4,956,795. In such signal converters, the signals from a sensor are amplified, linearized and then converted into a pulse width modulated signal which is proportional to the input signal from the sensor, by a voltage to pulse width converter circuit. This pulse width modulated signal is isolated by photocouplers, which also transmits the signal, and then the pulse width modulated signal is returned to the original voltage signal by a pulse width to voltage signal converter.

In signal converters of this type, when the output signal from the voltage to pulse width converter circuit is at a high level or a low level, an electrical current of the order of 10 mA continues to flow through the light emitting diodes of the photocouplers. Thus, when the pulse width is greatest, or when the duty factor is greatest, this current continues to flow. Consequently, the entire signal converter, using the prior art signal isolating circuit, consumes a large amount of electrical power. This presents a problem in a two wire signal converter which utilizes electrical power from a signal sent through the two wire transmission path for its operation and which two wire transmission path is also used as a path for transmitting the normalized signal.

Thus, the prior art isolating devices leave much to be improved.

SUMMARY OF THE INVENTION

Accordingly, an object of the invention is to overcome the foregoing and other deficiencies and disadvantages of the prior art.

Another object is to provide a signal isolating device which utilizes a small amount of power so that the device can be used in a two wire signal converter, and which also is not susceptible to extraneous noises.

A further object is to provide a signal isolating device which permits input and output distribution cables to be connected and removed from the isolating device in directions as desired, and which can be easily contained within a waterproof field casing in such a manner that the distribution cables do not interfere with the connection of an adjusting tool.

BRIEF DESCRIPTION OF THE DRAWINGS

FIG. 14(a) is a circuit diagram depicting a flip flop circuit, such as included in the embodiment of FIG. 11.

FIGS. 14(b)–14(h) are time charts depicting operation of the flip-flop circuit of FIG. 14(a).

DESCRIPTION OF PREFERRED EMBODIMENTS

Figure 1:
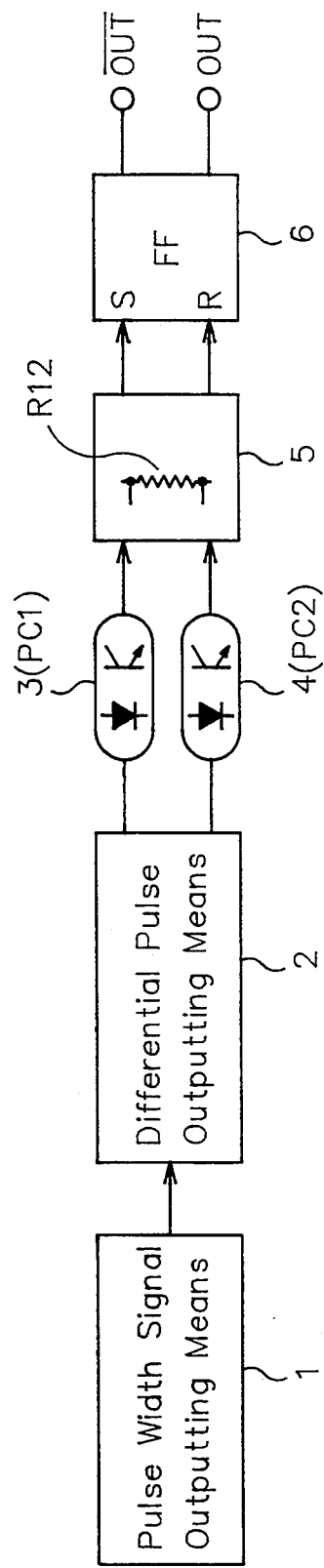
FIG. 1 is a block diagram depicting an illustrative embodiment of the invention.

FIG. 1 depicts a signal isolating device embodying the concepts of the invention, and comprising a pulse width signal outputting means 1 for pulse width modulating a signal to be isolated; a differential pulse outputting means 2 connected to the output of pulse width signal outputting means 1; a first photocoupler (PC1) 3 connected to the output of differential pulse outputting means 2; a second photocoupler (PC2) 4 also connected to the output of differential pulse outputting means 2; a differential pulse reception means 5 receiving output pulse signals from photocouplers 3 and 4; and a flip-flop circuit (FF) 6 which is set or reset according to the output pulse signal from differential pulse reception means 5. Pulse width signal outputting means 1 comprises a microprocessor, for example, and outputs a pulse width modulated signal. Differential pulse outputting means 2 receives pulse width modulated signals from pulse width signal outputting means 1 and produces differentiated pulses at the leading edge and trailing edge of the pulse width modulated signal. First photocoupler 3 is activated by a differentiated pulse which is produced at the leading edge. On the other hand, second photocoupler 4 is activated by a differentiated pulse which is produced at the trailing edge. A reception resistor R12, receiving both output signals from the first photocoupler 3 and the second coupler 4, is included in differential pulse reception means 5. Flip-flop circuit 6 produces reproduced pulse width modulated signals.

Figure 2:
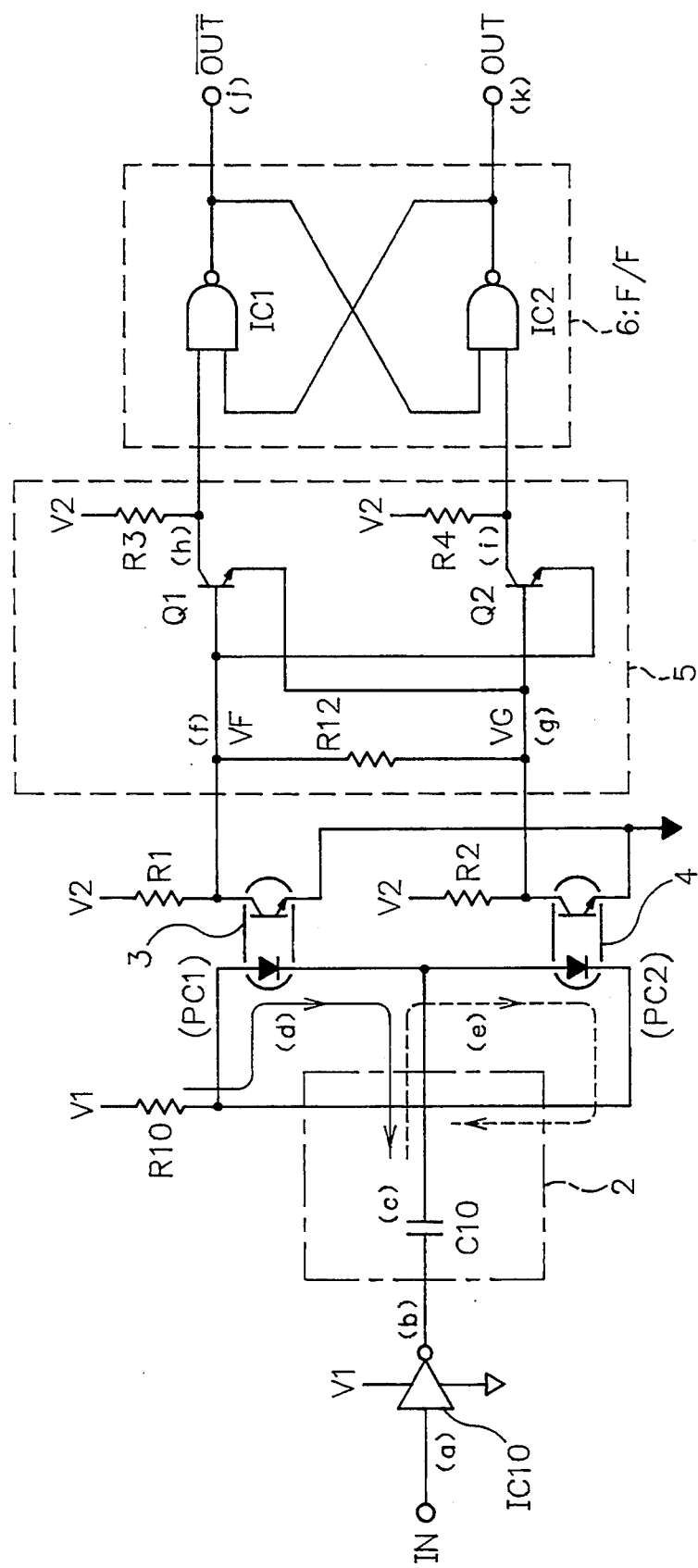
FIG. 2 is a circuit diagram of the FIG. 1 embodiment.

As shown in FIG. 2, differential pulse outputting means 2 comprises a differentiating capacitor C10 and produces a differentiated pulse signal of a negative polarity or a positive polarity at the leading edge or trailing edge, respectively, of the pulse width modulated signal applied via a CMOS inverter IC10. First photocoupler 3 is connected in such a manner that the differentiated pulse produced at the leading edge flow through its light emitting device (also called "LED") in a forward direction. Second photocoupler 4 is connected in such a manner that the differentiated pulse produced at the trailing edge flows through its light emitting device in a forward direction.

More specifically, the anode of the LED of first photocoupler 3 is connected to a voltage source V1, via a resistor R10, so that a differentiated pulse is applied to the cathode thereof. The cathode of the LED of second photocoupler 4 is connected to voltage source V1 via resistor R10 so that a differentiated pulse is applied to the anode thereof. The emitters of the phototransistors, inside of photocouplers 3,4, are connected together as shown. The collectors of the phototransistors are connected to load resistors R1 and R2, respectively. The other ends of load resistors R1, R2 are connected to voltage source V2. Voltage sources V1 and V2 are electrically insulated from each other, for example, by use of a transformer.

Differential pulse reception means 5 comprises a reception resistor R12, receiving pulse signals from both photocouplers 3 and 4; a transistor Q1, whose base is connected to one end of resistor R12 and whose emitter is connected to the other end of resistor R12; and a transistor Q2 whose base is connected to the other end of resistor R12 and whose emitter is connected to the other end of resistor R12. Load resistors R3 and R4 interconnect transistors Q1 and Q2, respectively, to voltage source V2.

Flip-flop circuit 6 comprises two gate circuits IC1 and IC2. Flip-flop circuit 6 is set by an output pulse from transistor 01 and reset by an output pulse from transistor 02.

The operation of the embodiment of FIGS. 1 and 2 will now be described in connection with the time charts of FIGS. 3(a)–3(k), which show examples of signal waveforms taken at various parts of FIG. 2. The voltage produced by voltage source V1 to which one end of resistor R10 is connected, is 5 volts. The voltage produced by voltage source V2, to which one end of each of resistors R1, R2, R3 and R4 is connected, is 10 volts.

As shown in FIG. 3(a), it is assumed that a pulse width modulated signal is applied to an input terminal IN. This pulse width modulated signal is inverted by CMOS inverter IC10, as shown in FIG. 3(b). This inverted pulse width modulated signal passes through differentiating capacitor C10 of differential pulse outputting means 2. As a result, as shown in FIG. 3(c), a differentiated pulse of negative polarity and a differentiated pulse of positive polarity are produced at the trailing edge and at the leading edge, respectively, of the pulse width modulated signal.

The differentiated pulse of negative polarity induces flow of a driving pulse as indicated by the solid line and arrow, which activates first photocoupler 3. Similarly, the differentiated pulse of positive polarity induces flow of a driving pulse as indicated by the broken line and arrow, which activates second photocoupler 4. Thus, current flowing through the LED of first photocoupler 3 takes a differential waveform as shown in FIG. 3(d). The current flowing through LED of second photocoupler 4 also assumes a differential waveform as shown in FIG. 3(e). The amounts of current consumed by these photocouplers are small.

In the differential pulse reception means 5, the opposite ends of reception resistor R12 are connected to the output terminals of photocouplers 3 and 4, respectively. Voltages VF and VG, developed at the opposite ends of resistor R12, change as shown in FIG. 3(f) and FIG. 3(g), respectively. For sake of clarity, FIGS. 3(h)–3(k) will be explained after discussion of FIGS. 4 and 5.

Figure 4:
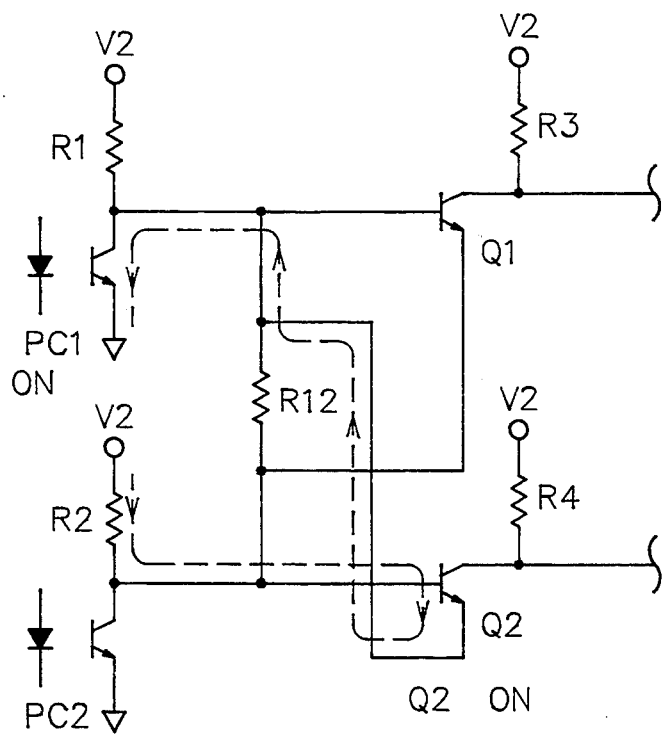
FIG. 4 is a circuit diagram depicting the current path in a differential pulse receiver circuit included in the circuit off FIG. 2 wherein a first photocoupler PC1 is activated.

FIG. 4 shows the current path in differential pulse reception circuit 5 when first photocoupler 3 is activated. Under this condition, current flows through load resistor R2, the base of transistor Q2, the emitter of transistor Q2, and first photocoupler 3, in that order, thus biasing transistor Q2 into conduction.

Figure 5:
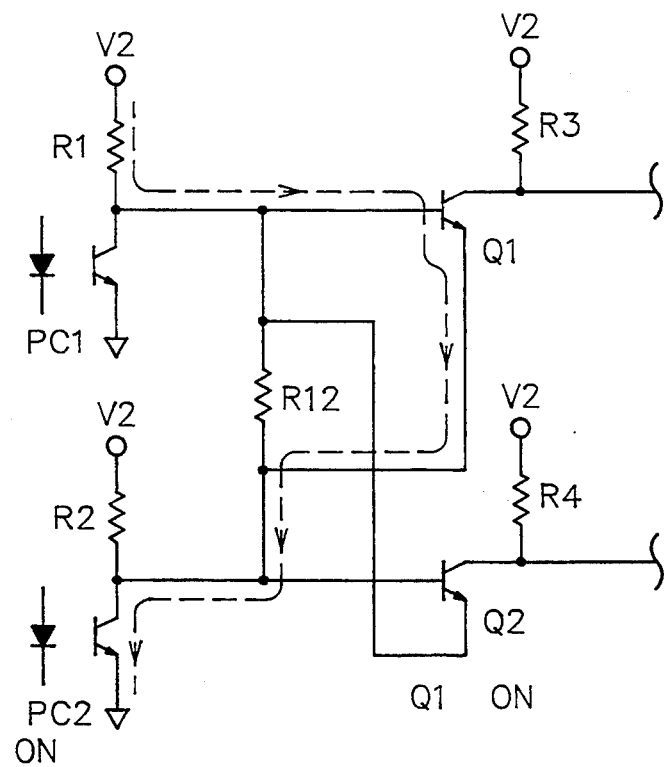
FIG. 5 is a circuit diagram, similar to FIG. 4, wherein a second photocoupler PC2 is activated.

FIG. 5 shows the current path in differential pulse reception circuit 5 when second photocoupler 4 is activated. Under this condition, the current flows through load resistor R1, the base of transistor Q1, the emitter of transistor Q1, and second photocoupler 4, thus biasing transistor Q1 into conduction.

Returning now to FIGS. 3(h)–3(k), let the supply voltage for the photocouplers be V2, then the relation between the values of load resistors R1, R2 and resistor R12 is given by the following:

$$V2 \cdot (R12)/(R1+R12) > 0.7 \text{ volts.}$$

Figure 3:
FIGS. 3(a)–3(k) are time charts depicting examples of waveforms of signals obtained at various parts of the FIG. 2 circuit.
Figure 3:
Figure 3:
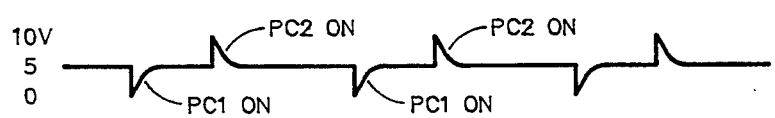
Figure 3:
Figure 3:
Figure 3:
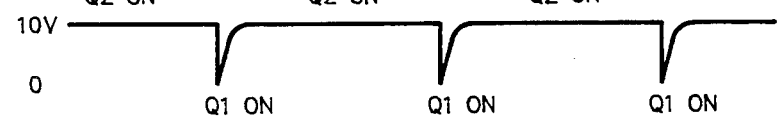
Figure 3:
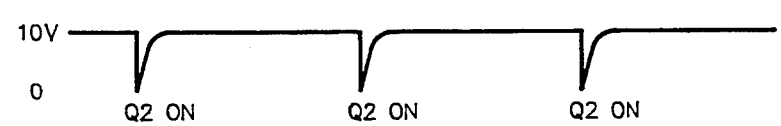

That is to say, these values are selected in such a manner that when one photocoupler, such as photocoupler 3, is activated, one transistor, such as Q2, is driven to be ON. As a result, the pulse signal, shown in FIGS. 3(h) and 3(i), respectively, appear at the output terminals of transistors Q1 and Q2 of differential pulse reception circuit 5. Flip-flop circuit 6 is set and reset by these pulse signals produced by differential pulse reception circuit 5, and reproduces the same pulse width modulated signal as output signals, as shown in FIGS. 3 (j) and 3 (k).

Figure 6:
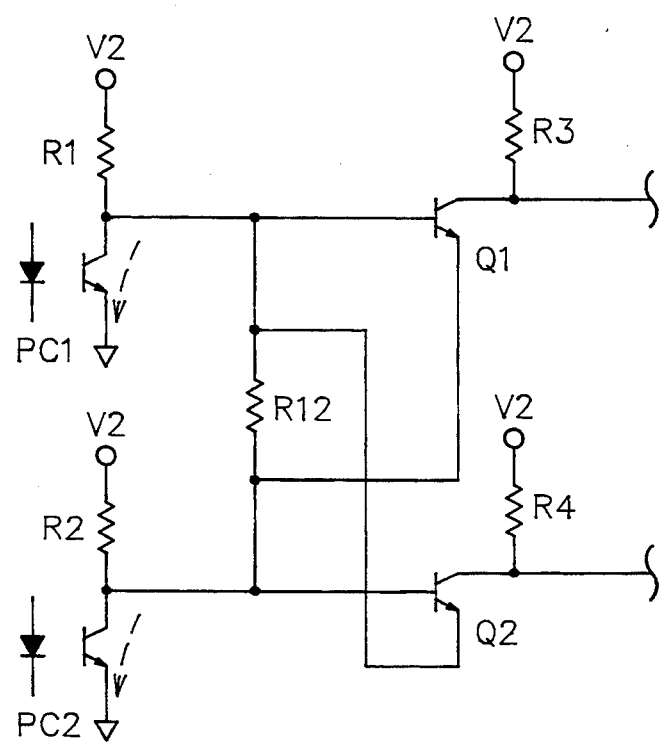
FIG. 6 is a circuit diagram, similar to FIGS. 4 and 5, wherein the first and second photocouplers are both simultaneously activated by intrusion of extraneous noise.

FIG. 6 shows the current path inside differential pulse reception circuit 5 when both photocouplers 3 and 4 are activated, such as by intrusion of extraneous noises. Under this condition, the voltages at the opposite ends of reception resister R12 assumes substantially the same value of 0 volt . Therefore, advantageously, neither of transistors Q1 and Q2 is biased into conduction.

In the embodiment, noise, which would normally activate the two photocouplers at the same time in prior art devices, is removed by the differential pulse reception circuit 5. Advantageously, only the intended pulse signal is transferred to flip-flop circuit 6. In this way, the isolating device of the invention is unaffected by extraneous noises, which is a substantial advance in the art.

Figure 7:
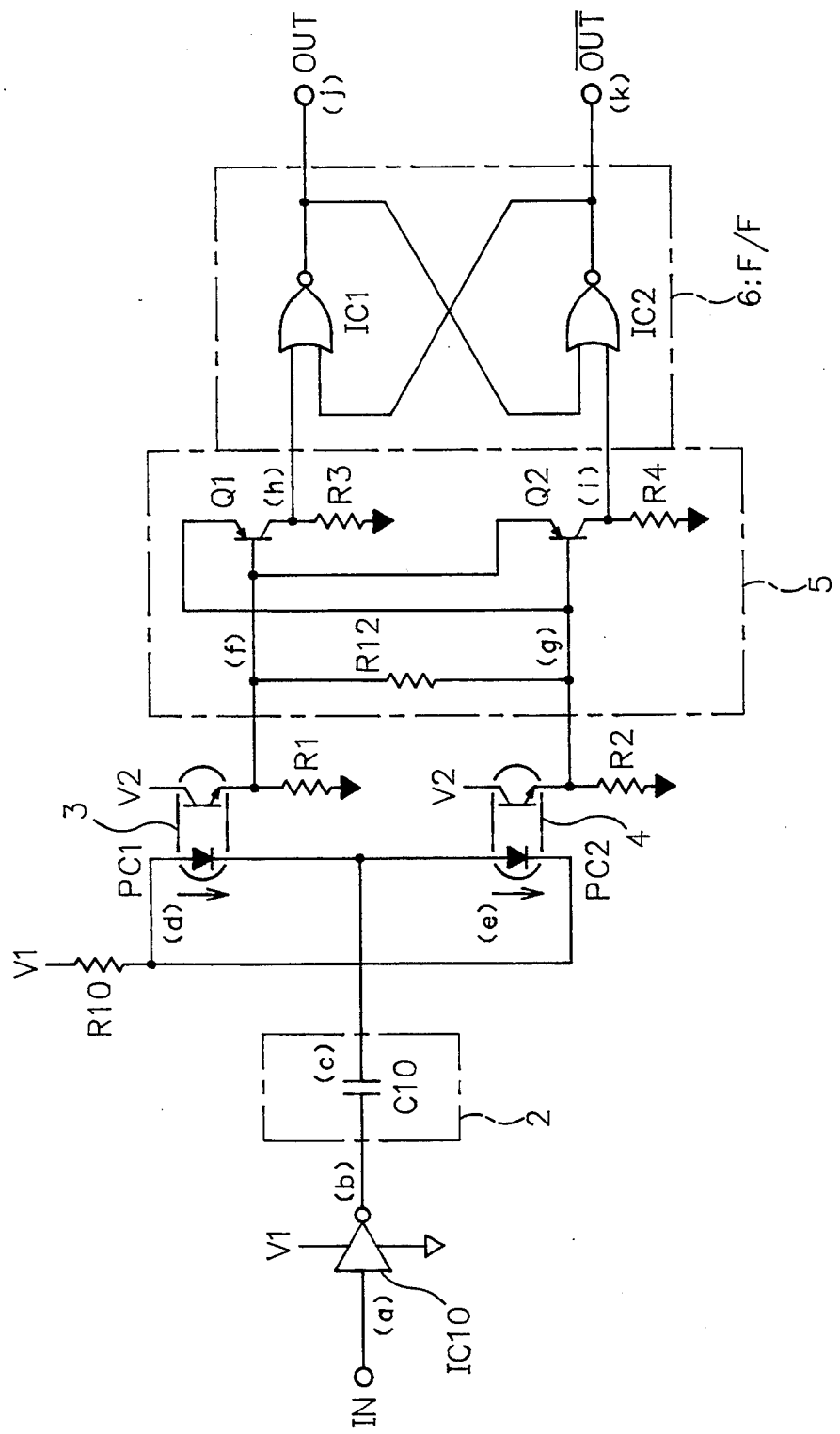
FIG. 7 is a circuit diagram depicting another illustrative embodiment of the invention.
Figure 8:
FIGS. 8(a)–8(k) are time charts depicting examples of waveforms of signals obtained at various parts of the circuit of FIG. 7.
Figure 8:
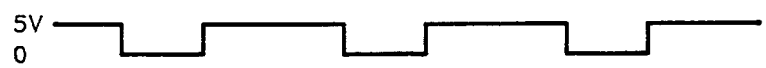
Figure 8:
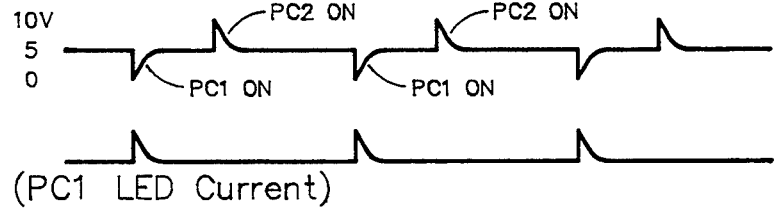
Figure 8:
Figure 8:
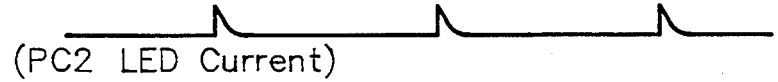
Figure 8:
Figure 8:
Figure 8:
Figure 8:

FIG. 7 depicts an embodiment which is similar to the embodiment of FIG. 2, except that in this embodiment, reception resistor of differential pulse reception circuit 5 is connected between the emitter of first photocoupler 3 and the emitter of second photocoupler 4. FIGS. 8(a)–8(k) are similar to FIGS. 3(a)–3(k), and are used to explain the operation of the FIG. 7 embodiment. The FIG. 7 device is similar in operation to the FIG. 2 device, except that the pulse signals produced at the opposite ends of reception resistor R12 and the pulse signals produced by transistors Q1 and Q2 all have such a polarity that the signals rise from 0 volt.

Figure 9:
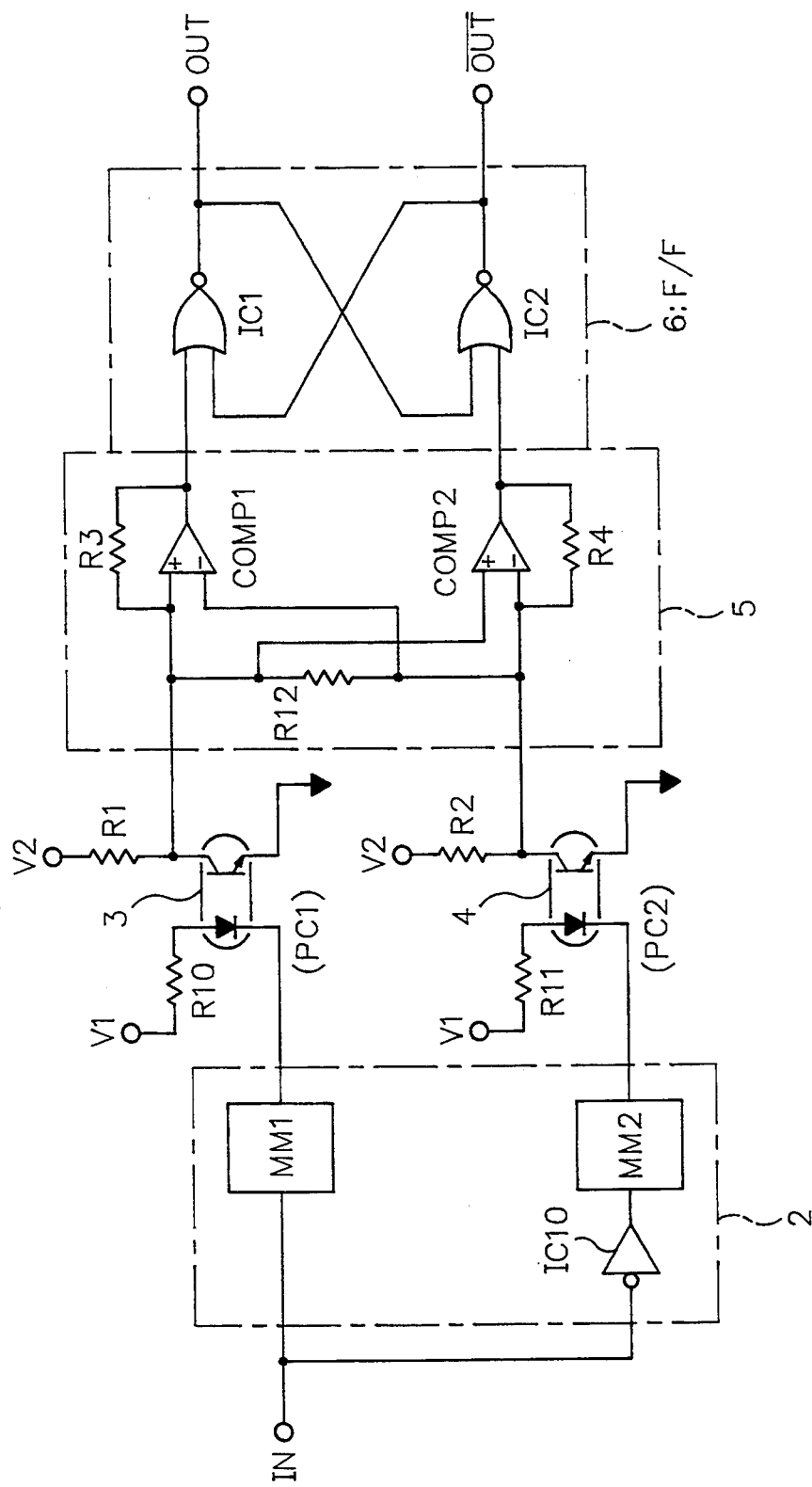
FIG. 9 is a circuit diagram depicting a further illustrative embodiment of the invention.

FIG. 9 depicts another illustrative embodiment, wherein differential pulse outputting means 2 comprises a monostable multivibrator MM1 triggered by the leading edge of a pulse width modulated signal, and anther monostable multivibrator MM2, triggered by the leading edge of the pulse width modulated signal applied via inverter IC10, and wherein differential pulse reception circuit 5 comprises comparators COMP1 and COMP2, to which are applied pulse signals of opposite polarity developed at the opposite ends of reception resistor R12.

Figure 10:
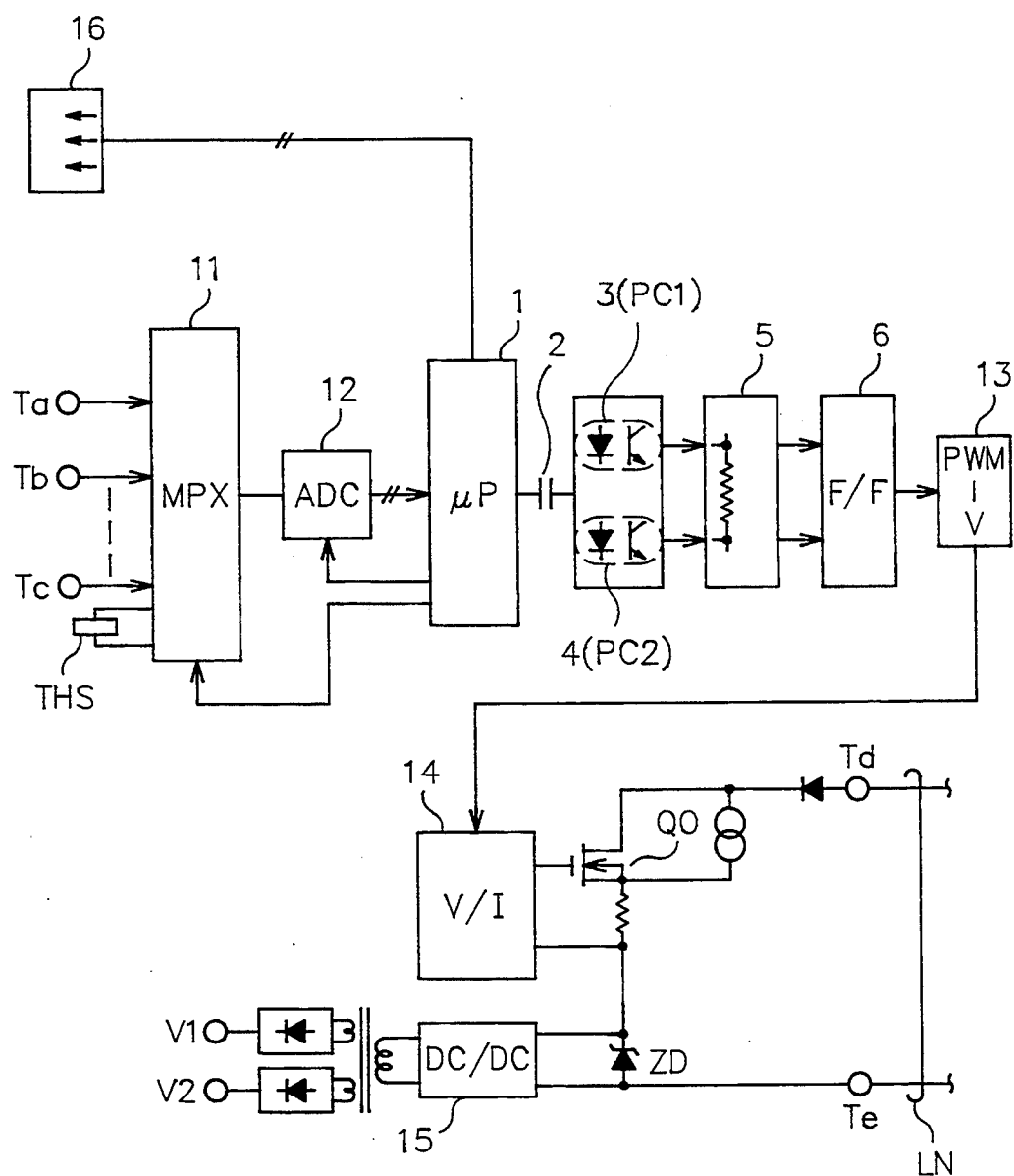
FIG. 10 is a block diagram depicting a two wire signal converter which uses a signal isolating device of the invention.

FIG. 10 shows a two wire signal converter, which utilizes a signal isolating device of the invention, and comprises a multiplexer 11 selectively receiving at its terminals Ta, Tb and Tc, an output signal from a temperature sensor, such as a thermocouple or a temperature sensing element, and an output signal from a temperature sensor THS that detects the temperature at one end of a thermocouple; an A/D (analog to digital) convert 12 for converting the output signal from multiplexer 11 into digital form; and a microprocessor 1 performing various arithmetic operations and controlling multiplexer 11 and A/D converter 12.

Microprocessor 1 has a connector 16, to which an adjusting tool, such as a handy terminal for adjusting the signal conversion functions performed by microprocessor 1, is connected. Microprocessor 1 produces a pulse width modulated signal to indicate the results of arithmetic operations. The signal is isolated by a differentiating capacitor 2, a first photocoupler 3, and a second photocoupler 4 and then applied to differential pulse reception circuit 5. The pulse width modulated signal reproduced by flip-flop circuit 6 is converted into a voltage signal by a pulse width to voltage signal converter 13. This voltage signal is converted into a current signal by a voltage to current converter circuit 14 and applied to a transistor, or FET, Q0 that is a current control means. Transistor Q0 controls the current flowing via a two wire transmission path LN connected to output terminals Td and Te, with a range of normalized currents of 4 to 20 mA, for example.

A DC/DC converter 15 receives a signal obtained from a Zener diode ZD disposed in the two wire transmission path LN, creates a plurality of voltage sources V1 and V2, and supplies such voltages V1,V2, to the various circuit components of the signal converter.

The amounts of electric current used by the two photocouplers 3 and 4 and by the differential pulse reception circuit 5, are very small. Hence, it is possible to derive the electric power needed to operate the entire circuit from the current flowing in the two wire transmission path LN. It is to be noted that the embodiment can be used wherever signal insulation is desired.

The invention has many advantages because it uses two photocouplers which are activated by differentiated pulses. Only the differential pulse signal components which are transmitted one after the other are removed. The electric power used is thus reduced. Also, the embodiment can be operated in a stable manner without being affected by extraneous noises. The power consumed by the device can be set at about 10 mA to 1 mA. Thus, the invention can be readily utilized in two wire signal converters, for example.

Figure 11:
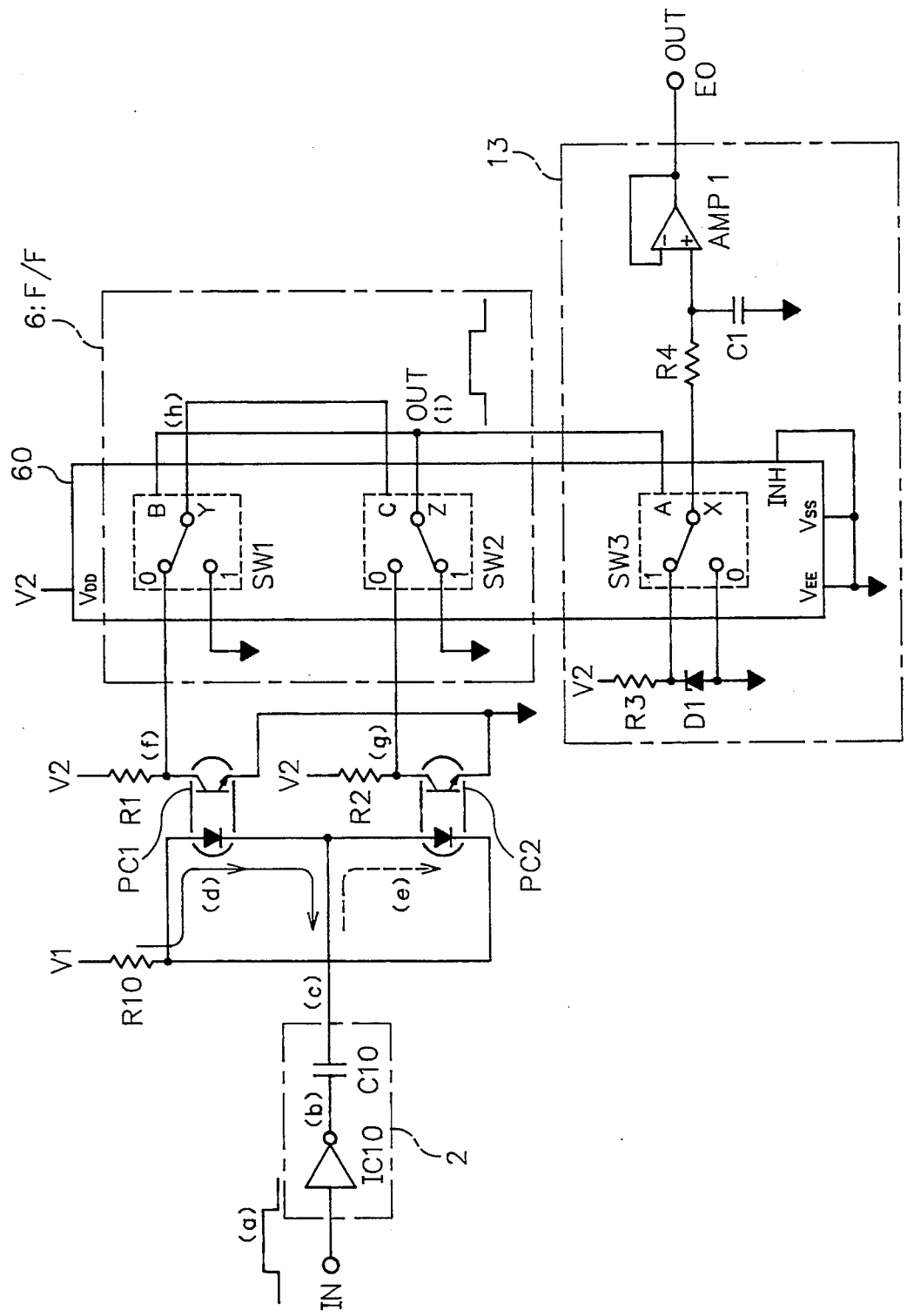
FIG. 11 is a circuit diagram depicting a still further illustrative embodiment of the invention.

FIG. 11 depicts a further embodiment comprising an input terminal IN to which a signal to be insulated is applied as a pulse width modulated signal; a differential pulse outputting means 2 receiving the pulse width modulated signal and producing differentiated pulses at the leading edge and the trailing edge of the pulse width modulated signal; a first photocoupler PC1 activated by the differentiated pulse produced at the leading edge of the pulse width modulated signal; a second photocoupler PC2 activated by the differentiated pulse produced at the trailing edge of the pulse width modulated signal; and a flip-flop circuit 6 which is set and reset by the pulse signal produced by first photocoupler PC1 and by the pulse signal produced by second photocoupler PC2, respectively, and outputs a pulse width modulate signal. In this embodiment, the flip-flop circuit 6 comprises first switch SW1 and second switch SW2.

A pulse width to voltage converter means 13 is connected to flip-flop circuit 6, and has a third switch SW3 activated by the pulse width modulate signal outputted from flip-flop circuit 6, and converts the pulse width modulated signal into a voltage signal E0. An analog switch 60 incorporates at least three switch circuits SW1, SW2, and SW3. For example, TC4053BP/BR, which is a $C^2MOS$ digital integrated circuit may be used as the analog switch. Switches SW1,SW2, SW3 may be fabricated using the switch circuits incorporated in this integrated circuit or IC.

A differentiated pulse outputting means 2 comprises a CMOS inverter IC10 and a differentiating capacitor C10 and produces differentiated pulse signals of negative and positive polarities at the leading edge and the trailing edge, respectively, off the pulse width modulated signal applied to terminal IN. One end of capacitor C10 is connected to photocouplers PC1 and PC2 in such a manner that the differentiated pulse produced at the leading edge flows through the LED of first photocoupler PC1 in a forward direction and that the differentiated pulse produced at the trailing edge flows through the LED of second photocoupler PC2 in a forward direction.

More specifically, the anode of the LED of first photocoupler PC1 is connected to a voltage source V1 via resistor R10 so that the differentiated pulse is applied to the cathode thereof. The cathode of the LED of second photocoupler PC2 is connected to voltage source V1 via resistor R10 so that the differentiated pulse is applied to the anode thereof. The emitters of the phototransistors included in the two photocouplers PC1 and PC2 are connected together. The collectors of such phototransistors are connected to load resistors R1 and R2, respectively. The other ends of load resistors R1 and R2 are connected to a voltage source V2. The voltage sources V1 and V2 are electrically insulated from each other, for example, by use of a transformer.

Flip-flop circuit 6 comprises a first switch SW1 and a second switch SW2 which are activated by output signals from their respective opposite switches.

The pulse width to voltage converter means 13 comprises a third switch SW3 for turning ON and OFF a constant voltage produced at a voltage regulation diode D1; a resistor R4; a capacitor C1; and an amplifier AMP1. Resistor R4; capacitor C1; and amplifier AMP1 cooperate to smooth the voltage signal outputted by switch SW3. A voltage signal E0 corresponding to the pulse width modulated signal appears at output terminal OUT.

Before describing the operation of the embodiment of FIG. 11, using the time charts of FIGS. 13(a)–13(i), the FIG. 12 circuits will be discussed.

Figure 12:
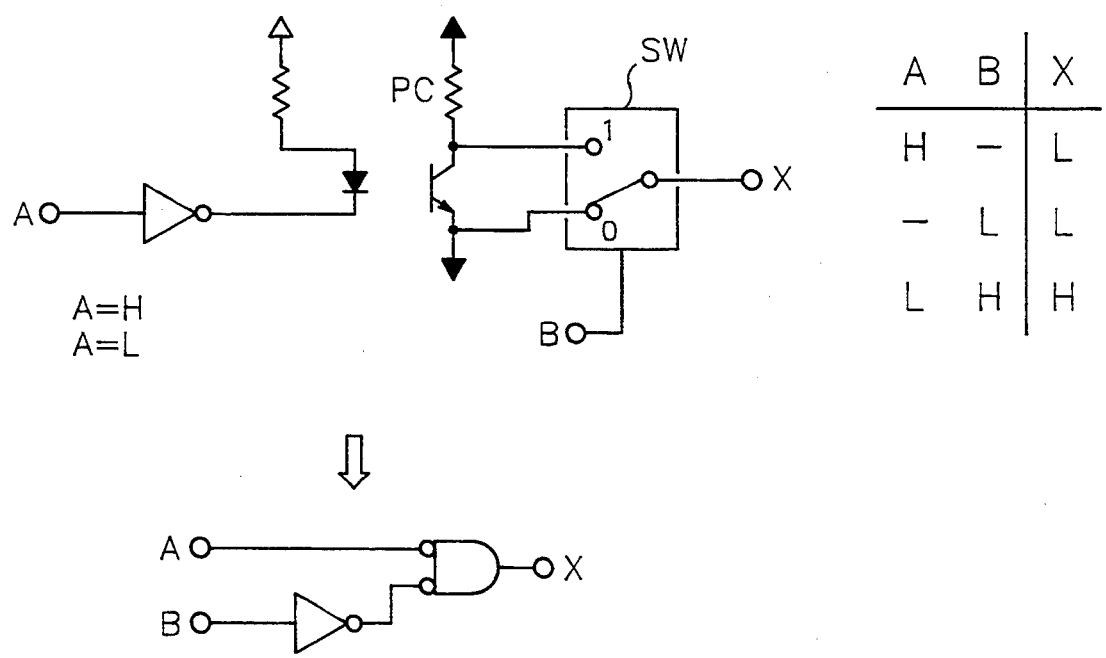
FIG. 12 shows diagrams depicting a circuit comprising various components of FIG. 11; an equivalent circuit thereof; and a logic table of the input and output signals thereof.

FIG. 12 shows a circuit formed by photocoupler PC and switch SW. An equivalent circuit of this circuit is also depicted together with a logic table indicating the relation of input signals A and B to output signal X. Switch SW is equivalent to a gate circuit and can be represented in terms of a combination of an inverter and a plurality of gates. Accordingly, a flip-flop circuit can be built by connecting two gate circuits in such a manner that their output terminals are connected to the input terminals of their mutual gates.

Returning now to FIG. 11, operation of this embodiment will now be described with reference to the time charts of FIGS. 13(a)–13(i). Voltage V1, supplied by the voltage source to which one end of resistor R10 is connected, is 5 volts. Voltage V2, supplied by the voltage source to which one end of resistors R1 and R2 is connected, is 10 volts.

Figure 13:
FIGS. 13(a)–13(i) are time charts depicting examples of waveforms of signals obtained at various parts of the FIG. 11 circuit.
Figure 13:
Figure 13:
Figure 13:
Figure 13:
Figure 13:
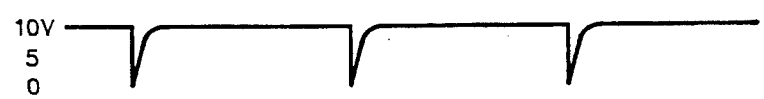
Figure 13:
Figure 13:

As shown in FIG. 13(a), it is assumed that a pulse width modulated signal is applied to terminal IN. This pulse width modulated signal is inverted by CMOS inverter IC10, as shown in FIG. 13(b). This inverted pulse width modulated signal passes through differentiating capacitor C10. As a result, as shown in FIG. 13(c), a differentiated pulse of negative polarity and a differentiated pulse of positive polarity are produced at the trailing edge at the leading edge, respectively, of the pulse width modulated signal.

The differentiated pulse of negative polarity induces flow of a driving pulse as indicated by the solid line and arrow, which activates first photocoupler PC1. Similarly, the differentiated pulse of positive polarity induces flow of a driving pulse as indicated by the broken line and arrow, which activates a second photocoupler PC2. Thus, the current flowing through the LED of first photocoupler PC1 takes a differential waveform, as shown in FIG. 13(d). The current flowing through the LED of second photocoupler PC2 assumes the differential waveform shown in FIG. 13(e). The amounts of current used by these photocouplers are small.

First photocoupler PC1 and second photocoupler PC2 produce pulse signals, as shown in FIGS. 13(f) and 13(g), respectively, which are supplied to flip-flop circuit 6 to set and reset the flip-flop circuit 6. Pulse width modulated signals, as shown in FIGS. 13(h) and 13(i), appear at the output terminal of flip-flop circuit 6.

In pulse width to voltage converter means 13, third switch SW3 extracts a reference voltage and 0 volt alternately according to the width modulated signal outputted from flip-flop circuit 6. The extracted signal is passed through a smoothing circuit, or a low-pass filter, comprising resistor R4, capacitor C1, and amplifier AMP1. In this manner, an analog output signal E0, which is proportional to the duty cycle of the pulse width modulated signal, is outputted at output terminal OUT.

FIG. 14(a) shows a flip-flop circuit comprising first photocoupler PC1, second photocoupler PC2, first switch SW1, and second switch SW2, such as included in the device of FIG. 11, wherein load resistors R1 and R2 for first photocoupler PC1 and second photocoupler PC2, respectively, are connected to their respective emitters.

FIGS. 14(b)–14(b) are timing charts used to describe the operation of the flip-flop circuit of FIG. 14(a). It is assumed that a pulse width modulated signal, such as shown in FIG. 14(b) is applied to an input terminal IN. When the level of the pulse width modulated signal is 0 volt, no current flows through the LEDs of the two photocouplers PC1, PC2. Voltages applied to terminals 1Y and 1Z of first switch SW1 and second switch SW2, respectively, are 0 volt. The switches are connected in the manner depicted. Under such condition, the Y terminal of first switch SW1 is at 0 volt, and 0 volt is applied to the C terminal of second switch SW2.

Since the Z terminal of second switch SW2 is connected to the 0Z terminal, a voltage signal of 10 volts is obtained at the Z terminal. This voltage signal is also applied to the B terminal of first switch SW1. The 1Y terminal is selected from the Y terminals of first switch SW1, and a voltage signal of 0 volt is delivered. In the illustrated state, therefore, a signal of 0 volt or a low level, appears at one output terminal OUT of the flip-flop circuit 6, as shown in FIG. 14(f). A signal of 10 volts, or a high level, appears at the other output terminal OUT, as shown in FIG. 14(h). This is a stable condition.

Under such condition, if the waveform of the pulse width modulated signal changes from a low level to a high level, first photocoupler PC1 is activated, thereby producing a pulse of 10 volts at the 1Y terminal of first switch SW1. Edge 1 of this pulse signal produces a voltage of 10 volts at the 1Y terminal of first switch SW1. A voltage of 10 volts is produced at the Y terminal. A voltage of 10 volts is supplied to the C terminal of second switch SW2. The selected terminal of second switch SW2 is changed from 0Z to 1Z. A voltage of 0 volt is produced at the Z terminal of second switch SW2. A voltage of 0 volt is applied to the B terminal of first switch SW1. The selected terminal of first switch SW1 is varied from 1Y to 0Y. A voltage of 10 volts is applied to the Y terminal of first switch SW1.

In this manner, a pulse of 10 volts appears at one end of load resistor R1. The potential at one output terminal OUT of the flip-flop circuit 6 changes from 0 volt to 10 volts, as shown in FIG. 14(f). As a result, a signal of high level is applied to the output terminal OUT. A signal of 0 volt, or low level, appears at the other output terminal OUT, as shown in FIG. 14(h). This is a stable condition.

Similarly, if the waveform of the pulse signal modulated signal makes a transition from a high level to a low level, the various waveforms change, as indicated at edge 2. A signal of low level appears at one output terminal OUT of flip-flop circuit 6, as shown in FIG. 14(f), and a signal of 10 volts, or high level, appears at the other output terminal OUT, as shown in FIG. 14(h). In this manner, the state changes, and flip-flop circuit 6 is in a stable condition. Flip-flop circuit 6, which may comprise two switches SW1 and SW2, receives output pulse signals from photocouplers PC1 and PC2 and produces a pulse signal modulated signal, corresponding to the pulse signal modulated signal applied to input terminal IN.

Figure 15:
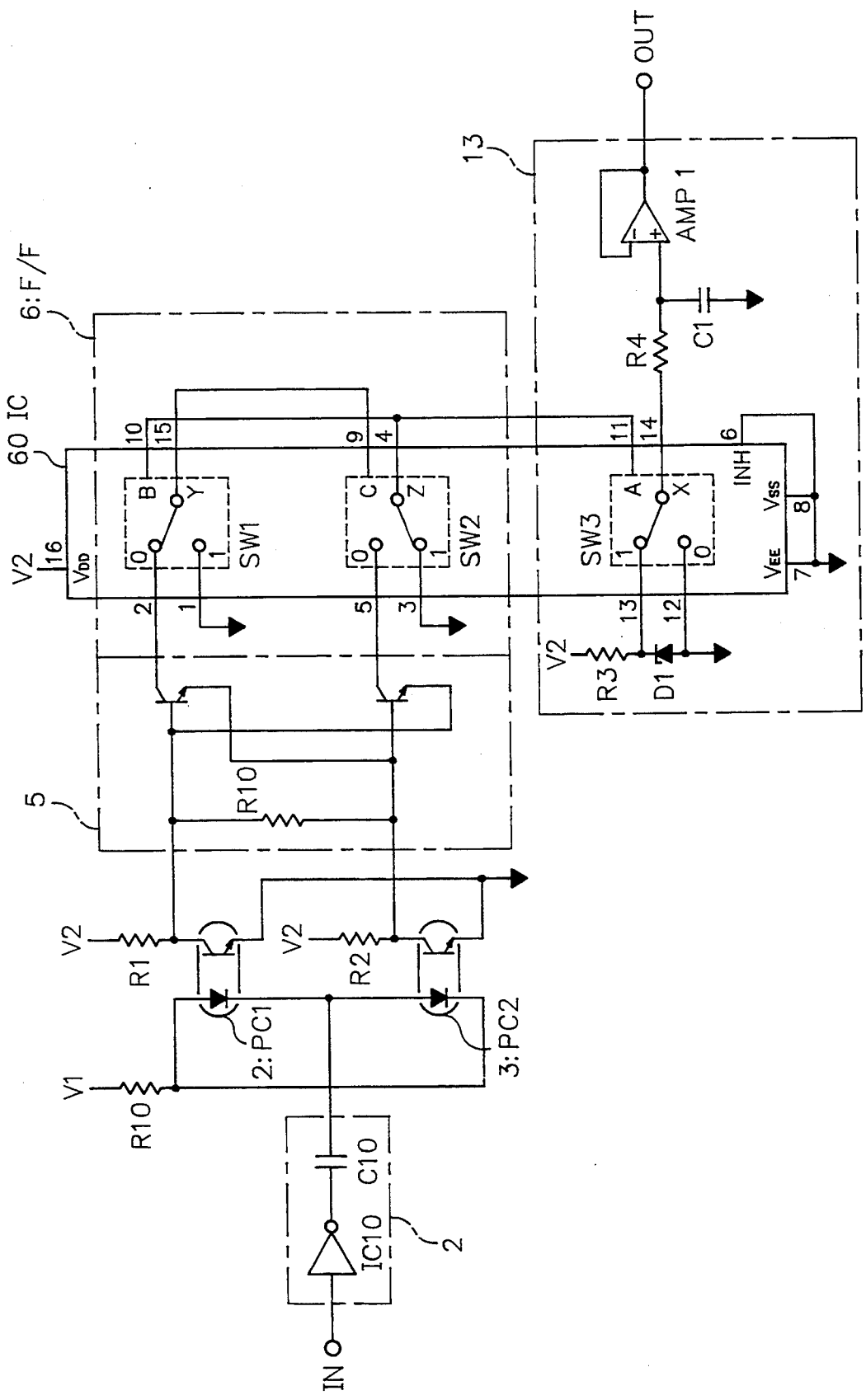
FIG. 15 is a circuit diagram depicting a yet further illustrative embodiment of the invention.

FIG. 15 shows another embodiment, wherein a reception resistor R10, receiving an output pulse signal from a first photocoupler PC1 and an output pulse signal from a second photocoupler PC2, is disposed together with the photocouplers PC1,PC2 and flip-flop circuit 6. A pulse reception circuit 5 produces a signal for setting or resetting flip-flop circuit 6 according to the signal generated at resistor R10.

In this embodiment, noises which enter via first photocoupler PC1 and second photocoupler PC2, respectively, flow through resistor R10 in opposite directions, so that, advantageously, the noises are canceled out. Consequently, the embodiment is not susceptible to noise.

Figure 16:
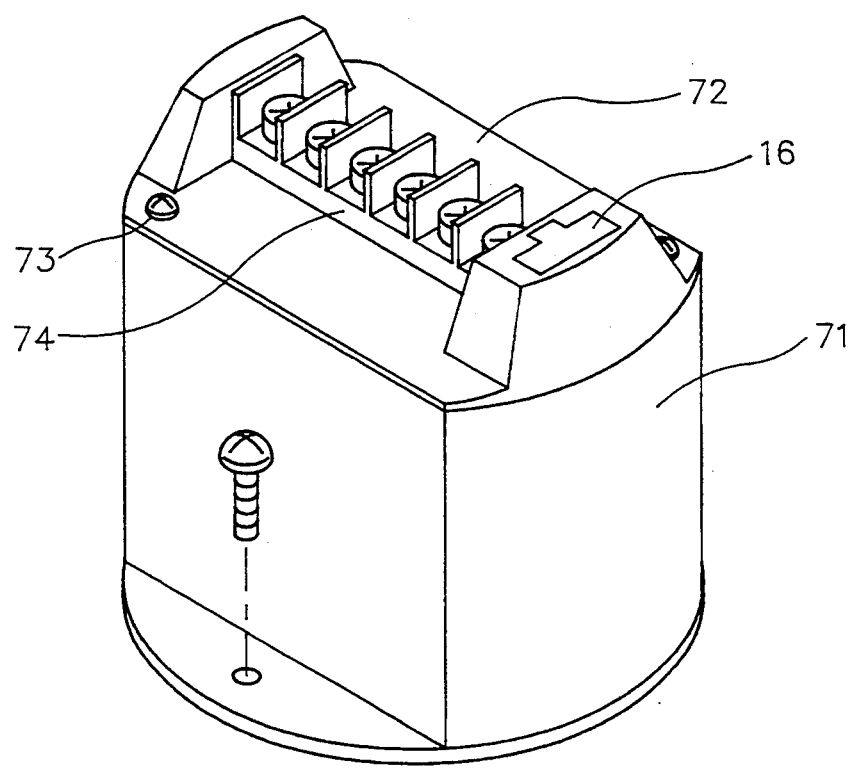
FIG. 16 is a perspective view depicting a transmitter using a signal isolating device of the invention.
Figure 17:
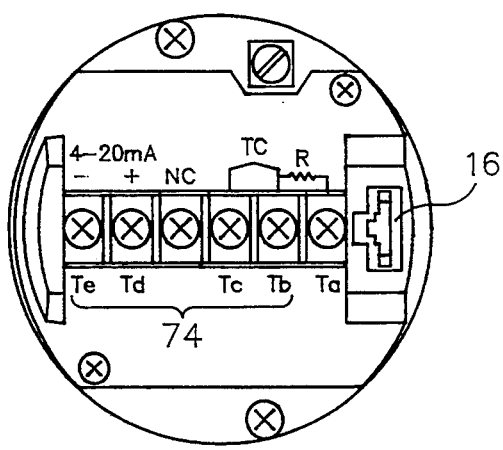
FIG. 17(a) is a plan view of the transmitter of FIG. 16.
FIG. 17(b) is a front elevational view of the transmitter of FIG. 17(a).
FIG. 17(c) is a side elevational view of the transmitter of FIG. 17(a).
Figure 17:
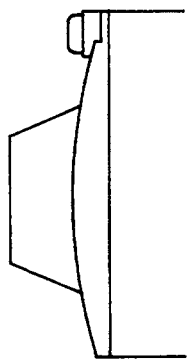
Figure 17:
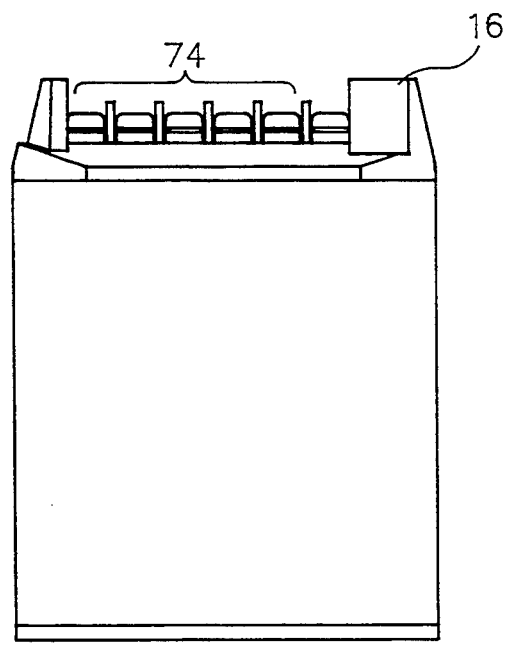

FIG. 16 shows, in perspective, a transmitter using a signal isolating device of the invention. FIG. 17(a) is a plan view of such transmitter; FIG. 17(b) is a front elevational view of such transmitter; and FIG. 17(c) is a side elevational view of such transmitter. The appearance and structure of the input and output terminals are so designed that the direction in which the input and output distribution cables can be connected to and disconnnected from the terminal can be selected as desired and that these cables can be easily accommodated in a waterproof field casing in such a manner that the cables do not interfere with the connection of an adjusting tool.

Referring to FIGS. 16, 17(a), 17(b) and 17(c), a cylindrical case 71 has the side walls thereof cut out. Case 71 has a space for accommodating the body of a signal converter which provides conversion or insulation of a signal. A cover 72 is mounted to the upper end of case 71 with screws 73. A terminal block 74, comprising a plurality of screwed terminals, electrically connects the input and output terminals of the signal converter disposed in case 71 with the outside of case 71. A connector 16 connects an adjusting tool, such as a handy terminal, which adjusts the signal converter disposed in case 71. Terminal block 74, which electrically connects the input and output terminals and connector 16, are arranged in a line.

Figure 18:
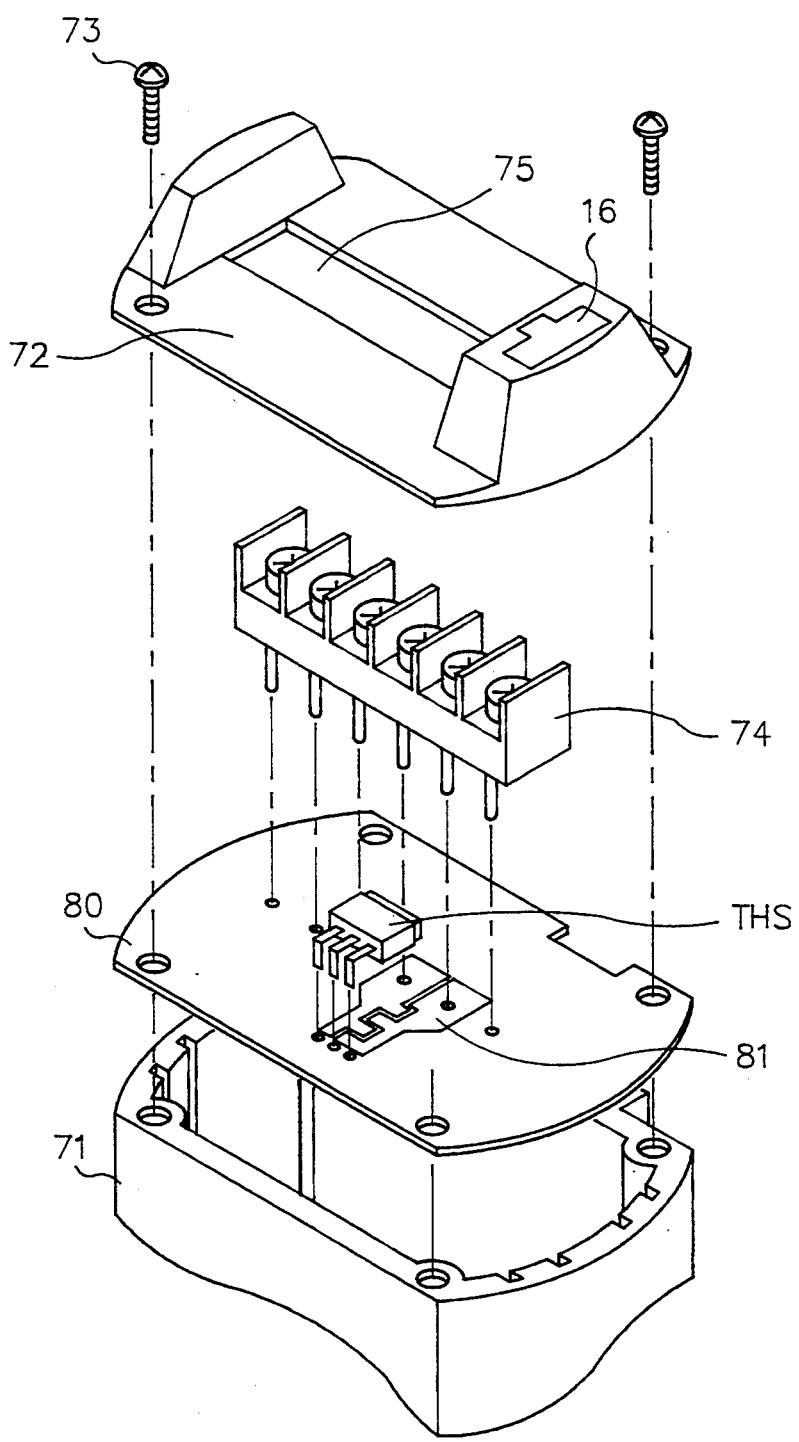
FIG. 18 is an exploded perspective view depicting a subassembly of a case and a cover included in the transmitter of FIG. 16.

FIG. 18 shows a sub-assembly of a terminal comprising casing 71 and cover 72. The sub-assembly receives a signal from a thermocouple, or the like, and converts the signal to another form. A printed wiring board 80 has a thermally equalizing pattern 81 over which terminal block 74 is installed. Also, a temperature sensor THS, for detecting the terminal temperature to provide compensation for a cold junction of a thermocouple, is disposed on pattern 81. Cover 72 is provided with a rectangular hole 75 through which terminal block 74 extends. Connector 16 is adjacent to hole 75. Connector 16 and printed wiring board 80 have cables (not shown) for electrical connection.

Printed wiring board 80 is sandwiched between cover 72 and case 71. Terminal block 74 is attached to case 71 so as to extend outwardly through rectangular hole 75 in cover 72.

An electrical circuit, such as that shown, for example, in FIG. 10, is disposed in case 71. In FIG. 10, a three wire temperature sensing resistor is connected to input terminals Ta,Tb, and Tc. As an example, a thermocouple is connected between input terminals Tb and Tc. A two wire transmission path LN, for supplying electric power and transmitting signals, is connected between output terminals Td and Te.

When an adjustment is made, a connector connected to an adjusting tool, such as a handy terminal, is connected to connector 16 to place various formulas and constants, used for calculations, into a microprocessor 1, or to modify such formulas and constants according to the type or range of sensors used.

Figure 19:
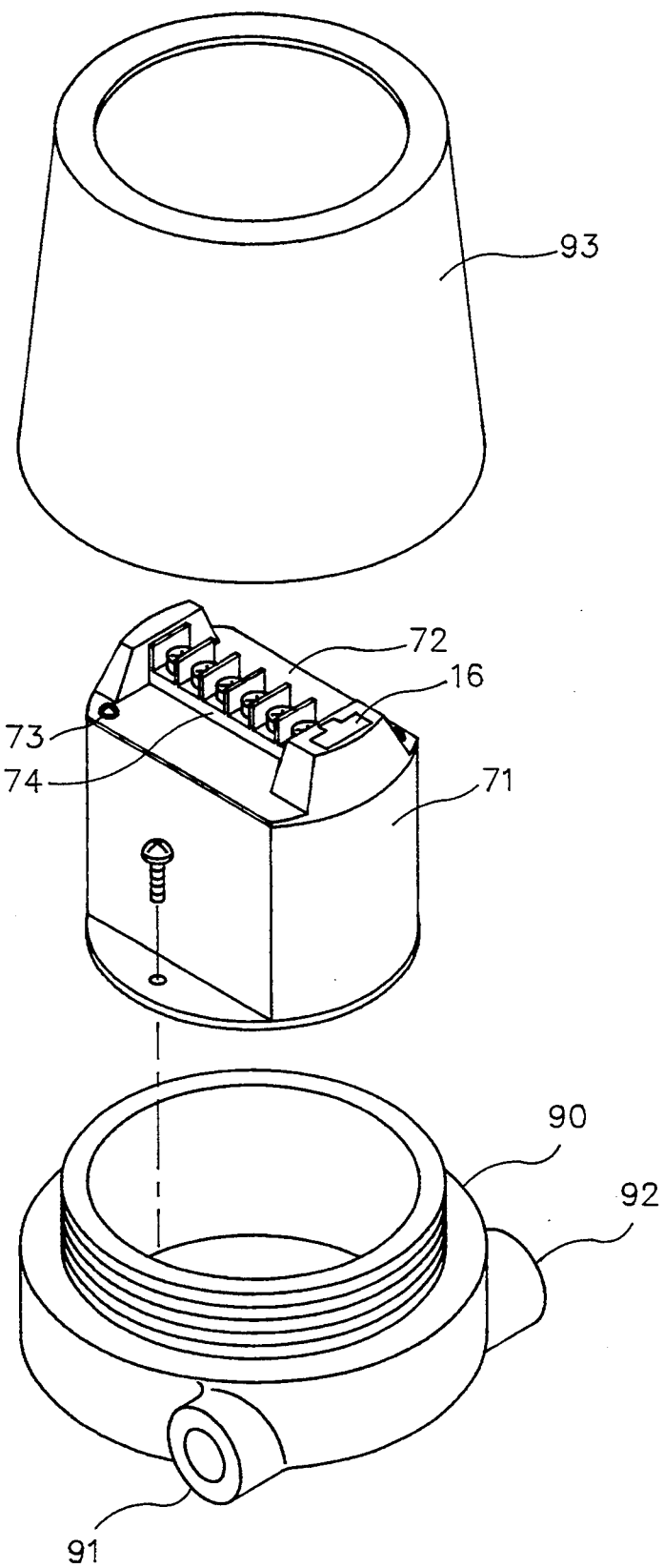
FIG. 19 is an exploded perspective view depicting a waterproof field case having a transmitted contained therewithin.

FIG. 19 shows a waterproof field case used to install outdoors the case having the signal converter therein. The field case 90 has cable ports 91 and 92 disposed in opposing relation and through which distribution cables are inserted and removed. First,input distribution cables and output distribution cables are inserted through cable port 91 or 92. The cables are raised in such a manner that the cables extend along the outer side wall of inner case 71. Then, the cables are fixed to the corresponding screwed terminals of terminal block 74 which are exposed over the inner cover 72. Frequently, the directions of the input and output distribution cables are not determined by usage. For example, in one situation, the input and output distribution cables may be pulled out of case 71 in opposite directions. In another situation, the cables may be both removed in the same direction. Thus, depending on the desired effect the cables are inserted through either cable port 91 or 92. Advantageously, such choice increases efficiency of connection and operation.

In this embodiment, screwed terminal block 74 is located in the center of the top portion of case 71. Thus, if the distribution cables are inserted either through port 91 or 92, the cables can be connected and fastened to the corresponding screwed terminals in such a manner that the cables do not interfere with the connection operation. After the cables have been connected and fastened to the corresponding screwed terminals, connector 16 and terminal block 74 are kept arranged in a line. Thus, the distribution cables which have already been laid do not cover connector 16. Consequently, if the adjusting tool is connected to connector 16 after inner case 71 is inserted into field case 90, the connection operation can be performed easily and smoothly, since the cables will not interfere with such operation.

After the completion of the adjusting operation, using an adjusting tool, cover 93 of field case 90 is placed on inner case 91 and the two are joined together. The cable port, in which no cables are inserted, and the gap between the cables and the loaded cable port are plugged up with a waterproof material, such as an adhesive, or the like.

When the above embodiment is placed outdoors, the screwed terminals, the connector, and the internal electrical circuit are protected against, dew condensation and rain or other adverse environmental elements. Since the screwed terminal block and the connector for connecting the adjusting tool are arranged in a line, the distribution cables can be easily pulled out in either directions. When the adjusting tool is connected, the cables do not interfere with the connector. Thus, when the signal converter is being placed in the field case or is being maintained, the work can be carried out effectively and without error or difficulty.

In the embodiment, it is assumed that the electrical circuit contained in the inner case transfers temperature signals by means of two wires. However, the transmitter may also transfer signals from other sensors and using other that two wire transmission.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A signal isolating device for pulse width modulating a signal to be insulated and insulating the signal by use of photocouplers, said signal isolating device comprising a differential pulse outputting means for receiving a first pulse width modulated signal and for producing differentiated pulses at a leading edge and at a trailing edge of said first pulse width modulated signal;

a first photocoupler activated by said differentiated pulse produced at said leading edge;

a second photocoupler activated by said differentiated pulse produced at said trailing edge;

a differential pulse reception means, comprising a reception resistor, for receiving both pulse signals from said first photocoupler and said second photocoupler, and for producing a set pulse or a reset pulse according to a signal generated at said reception resistor; and a flip-flop circuit which is set or reset by said pulse signal produced by said differential pulse reception means and which produces a second pulse width modulated signal corresponding to said first pulse width modulated signal.

2. The device of claim 1, wherein said differential pulse outputting means comprises a first monostable multivibrator which is triggered by said leading edge or said trailing edge of said first pulse width modulated signal; and a second monostable multivibrator which is triggered by said leading edge or said trailing edge of said first pulse width modulated signal applied via an inverter.

3. A signal isolating device for pulse width modulating a signal to be insulated and insulating the signal by use of photocouplers, said signal isolating device comprising a differential pulse outputting means for receiving a first pulse width modulated signal and for producing differentiated pulses at a leading edge and at a trailing edge of said first pulse width modulated signal;

a first photocoupler activated by said differentiated pulse produced at said leading edge;

a second photocoupler activated by said differentiated pulse produced at said trailing edge;

a flip-flop circuit means comprising a first switch and a second switch and being set and reset by output pulse signals from said first photocoupler and said second photocoupler, respectively; and a pulse width to voltage signal converter means comprising a third switch which is turned ON and OFF according to a pulse width modulated signal produced by said flip-flop circuit means; wherein said first switch, said second switch, and said third switch are fabricated on one integrated circuit.

4. The device of claim 3, further comprising a pulse reception means, comprising a reception resistor, for receiving output signals from said first photocoupler and said second photocoupler and for producing a set pulse or a reset pulse according to a signal produced at said reception resistor.

5. A signal isolating device for pulse width modulating a signal to be insulated and insulating the signal by use of photocouplers, said signal isolating device comprising a differential pulse outputting means for receiving a first pulse width modulated signal and for producing differentiated pulses at a leading edge and at a trailing edge of said first pulse width modulated signal;

a first photocoupler activated by said differentiated pulse produced at said leading edge;

a second photocoupler activated by said differentiated pulse produced at said trailing edge;

a differential pulse reception means, comprising a reception resistor, for receiving both pulse signals from said first photocoupler and said second photocoupler, and for producing a set pulse or a reset pulse according to a signal generated at said reception resistor; and a flip-flop circuit which is set or reset by said pulse signal produced by said differential pulse reception means and which produces a second pulse width modulated signal corresponding to said first pulse width modulated signal; wherein said differential pulse reception means comprises said reception resistor which receives output pulse signals from said first photocoupler and said second photocoupler;

a first transistor comprising a base connected to one end of said reception resistor, and an emitter connected to the other end of said reception resistor; and a second transistor comprising a base connected to said other end of said reception resistor and an emitter connected to said one end of said reception resistor.

6. The device of claim 5, wherein said differential pulse outputting means comprises a first monostable multivibrator which is triggered by said leading edge or said trailing edge of said first pulse width modulated signal; and a second monostable multivibrator which is triggered by said leading edge or said trailing edge of said first pulse width modulated signal applied via an inverter.

7. A signal isolating device for pulse width modulating a signal to be insulated and insulating the signal by use of photocouplers, said signal isolating device comprising a differential pulse outputting means for receiving a first pulse width modulated signal and for producing differentiated pulses at a leading edge and at a trailing edge of said first pulse width modulated signal;

a first photocoupler activated by said differentiated pulse produced at said leading edge;

a second photocoupler activated by said differentiated pulse produced at said trailing edge;

a differential pulse reception means, comprising a reception resistor, for receiving both pulse signals from said first photocoupler and said second photocoupler, and for producing a set pulse or a reset pulse according to a signal generated at said reception resistor; and a flip-flop circuit which is set or reset by said pulse signal produced by said differential pulse reception means and which produces a second pulse width modulated signal corresponding to said first pulse width modulated signal; wherein said differential pulse reception means comprises said reception resistor which receives output pulse signals from said first photocoupler and said second photocoupler; and two comparators to which signals of opposite polarities developed at opposite ends of said reception resistor are applied.

8. The device of claim 7, wherein said differential pulse outputting means comprises a first monostable multivibrator which is triggered by said leading edge or said trailing edge of said first pulse width modulated signal; and a second monostable multivibrator which is triggered by said leading edge or said trailing edge of said first pulse width modulated signal applied via an inverter.

* * * * *